US010079659B2

(12) United States Patent
Lin

(10) Patent No.: US 10,079,659 B2
(45) Date of Patent: Sep. 18, 2018

(54) PROCESSING METHOD AND SYSTEM FOR HYBRID AUTOMATIC REPEAT REQUEST DATA TRANSMISSIONS

(71) Applicant: HON HAI PRECISION INDUSTRY CO., LTD., New Taipei (TW)

(72) Inventor: Yu-Hsin Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 63 days.

(21) Appl. No.: 15/168,259

(22) Filed: May 31, 2016

(65) Prior Publication Data

US 2016/0359590 A1 Dec. 8, 2016

(30) Foreign Application Priority Data

Jun. 3, 2015 (TW) .............................. 104117937 A

(51) Int. Cl.
*H04L 1/18* (2006.01)
(52) U.S. Cl.
CPC .......... *H04L 1/1861* (2013.01); *H04L 1/1864* (2013.01)
(58) Field of Classification Search
CPC ... H04L 1/1812; H04L 1/1887; H04L 1/1896; H04L 1/1822; H04L 5/0055; H04L 1/1861; H04L 1/1864; H04L 1/1854; H04L 1/1858; H04W 24/02; H04W 24/10
See application file for complete search history.

(56) References Cited

U.S. PATENT DOCUMENTS

| 8,230,291 | B2* | 7/2012 | Cai ....................... H04L 1/1822 714/748 |
| 8,824,347 | B2* | 9/2014 | Pelletier ................ H04L 1/1883 370/252 |
| 8,891,445 | B2* | 11/2014 | Ishii ................... H04W 72/0446 370/328 |
| 8,923,234 | B2* | 12/2014 | Park ...................... H04W 48/16 370/252 |
| 9,686,705 | B2* | 6/2017 | Dural .................... H04W 24/10 |
| 2009/0168731 | A1 | 7/2009 | Zhang et al. |
| 2010/0017671 | A1* | 1/2010 | Cai ....................... H04L 1/1822 714/748 |

(Continued)

FOREIGN PATENT DOCUMENTS

| CN | 102067648 B | 6/2013 |
| WO | 2009113816 A2 | 9/2009 |
| WO | 2010017222 A1 | 2/2010 |

*Primary Examiner* — Hassan Kizou
*Assistant Examiner* — Roberta A Shand
(74) *Attorney, Agent, or Firm* — ScienBiziP, P.C.

(57) ABSTRACT

In data transmissions, a processing method for hybrid automatic repeat request (HARQ) is applied to a transmitter transmitting a first semi-persistent scheduling (SPS) data packet to a receiver. The receiver receives the first SPS data packet and transmits feedback to the transmitter. The transmitter which receives the feedback message can determine that a transmission of a repeat SPS data packet is required when the feedback message is a negative acknowledgement, and a repeat SPS data packet together with a HARQ ID corresponding to the repeat SPS data packet is transmitted to the receiver. If the receiver can match the repeat SPS data packet with the first SPS data packet according to the HARQ ID, a combination of the first SPS data packet and the repeat SPS data packet can be decoded.

6 Claims, 3 Drawing Sheets

(56) References Cited

U.S. PATENT DOCUMENTS

| | | |
|---|---|---|
| 2010/0074215 A1 | 3/2010 | Park et al. |
| 2011/0093756 A1 | 4/2011 | Yang et al. |
| 2013/0039295 A1* | 2/2013 | Chou .................. H04W 72/042 370/329 |
| 2014/0040694 A1* | 2/2014 | Verma ................... H04L 1/1812 714/748 |

* cited by examiner

PROCESSING METHOD AND SYSTEM FOR HYBRID AUTOMATIC REPEAT REQUEST DATA TRANSMISSIONS

CROSS-REFERENCE TO RELATED APPLICATIONS

This application claims priority to Taiwanese Patent Application No. 104117937 filed on Jun. 3, 2015, the contents of which are incorporated by reference herein.

FIELD

The subject matter herein generally relates to data transmission technology.

BACKGROUND

Hybrid automatic repeat request (HARQ) is a combinative technology of forward error correction (FEC) and automatic repeat request (ARQ). When a data packet is transmitted from a transmitter, the transmitter may wait for a feedback message, including an acknowledgement (ACK) message or a negative acknowledgement (NACK) message, from a receiver. If the transmitter receives the NACK message, the transmitter re-transmits the data packet automatically.

A measurement gap (MG) is a period of time for measurement of different frequencies by the receiver. During the MG the transmitter and the receiver cannot transmit or receive data packets. If the receiver transmits the feedback message to the transmitter during the MG the feedback message may be lost such that the transmitter cannot receive the feedback message. If no NACK message is received, the transmitter will not re-transmit the data packet.

Data transmitting via semi-persistent scheduling (SPS) can be distributed once and used repeatedly. If the transmitter receives a NACK message corresponding to a SPS data packet from the receiver, the transmitter re-transmits the SPS data packet via dynamic scheduling assignment. However, when the transmitter re-transmits an SPS data packet to a receiver without getting a HARQ ID of the retransmitted SPS data packet, the receiver cannot match the retransmitted SPS data packet with an initial SPS data packet. Therefore, the receiver may decode a combination of a wrong data packet and the initial SPS data packet, thereby resulting in decoding failure and time delay.

BRIEF DESCRIPTION OF THE DRAWINGS

Implementations of the present technology will now be described, by way of example only, with reference to the attached figures, wherein.

DETAILED DESCRIPTION

Figure 1:
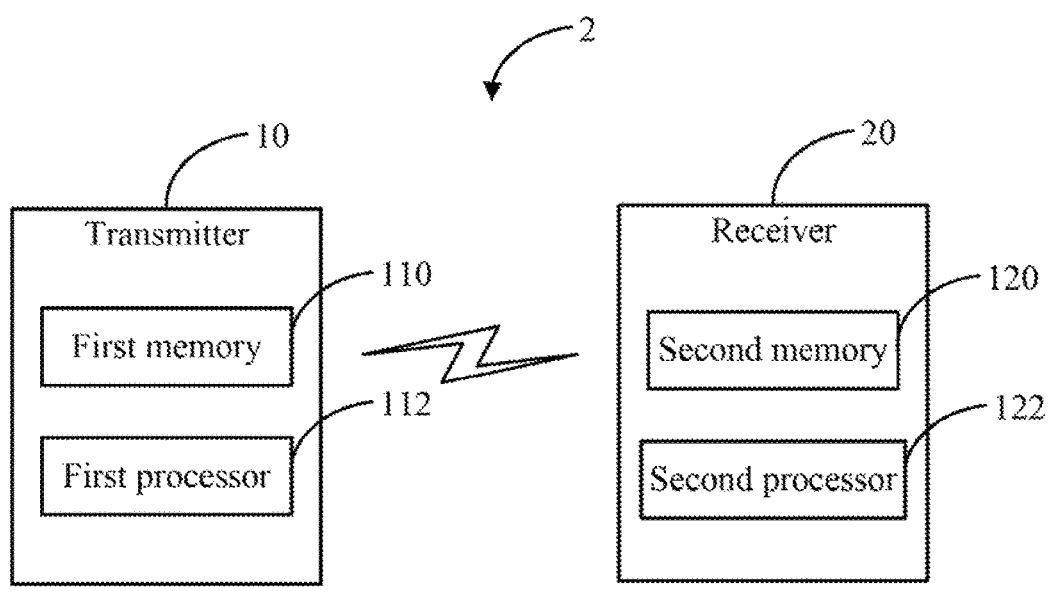
FIG. 1 illustrates a block diagram of an embodiment of a processing system for HARQ data transmissions.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a processing system 2 for hybrid automatic repeat request (HARM) data transmissions. In the embodiment, the communication system 2 is included in a long term evolution (LTE) network. The communication system 2 includes a transmitter 10 and a receiver 20. The transmitter 10 transmits data packets to the receiver 20 via the network. The receiver 20 receives the data packets and transmits feedback messages to the transmitter 10. The transmitter 10 may be an evolved Node B (eNB). The receiver 20 may be a user equipment (UE).

In the embodiment, the transmitter 10 includes a first memory 110 and a first processor 112. The receiver 20 includes a second memory 120 and a second processor 122. The transmitter 10 or the receiver 20 includes one or more function modules. The one or more function modules can include computerized code in the form of one or more programs that are stored in the first memory 110 or the second memory 120, and executed by the first processor 112 or the second processor 122 to provide functions of the transmitter 10 or the receiver 20. The first memory 110 or the second memory 120 can be a dedicated memory, such as an EEPROM or a flash memory. Descriptions of the functions of the transmitter 10 and the receiver 20 are given with reference to FIG. 2.

Figure 2:
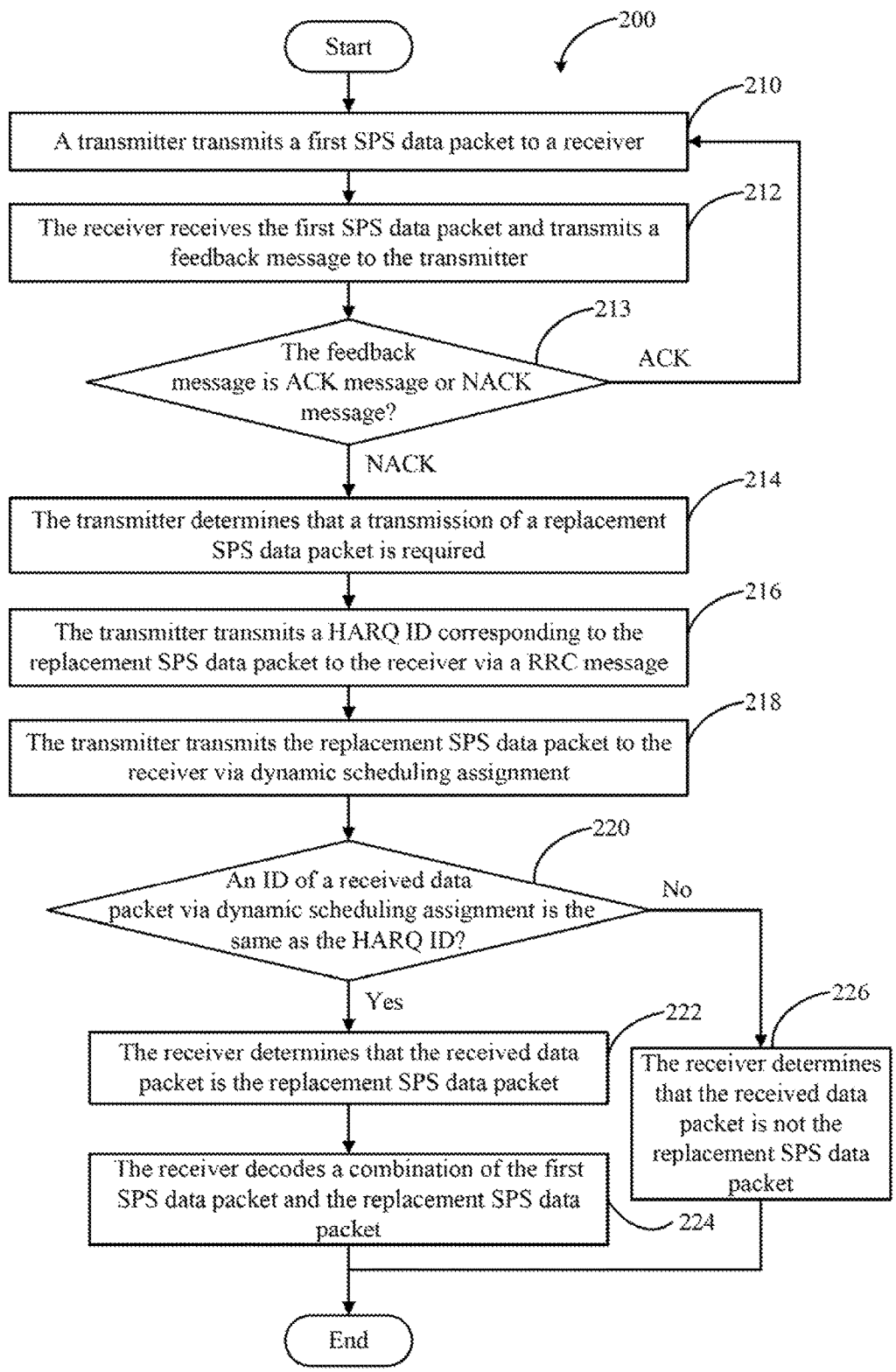
FIG. 2 illustrates a flowchart of an embodiment of a processing method for HARQ data transmissions.

Referring to FIG. 2, a flowchart is presented in accordance with an example embodiment of a processing method 200 for HARQ data transmissions. The method 200 is provided by way of example, as there are a variety of ways to carry out the method. The method 200 described below can be carried out using the configurations illustrated in FIG. 1, for example, and various elements of these figures are referenced in explaining the method 200. Each block shown in FIG. 2 represents one or more processes, methods, or subroutines, carried out in the exemplary method 200. Additionally, the illustrated order of blocks is by example only and the order of the blocks can change. The method 200 can begin at block 210.

At block 210, the transmitter 10 transmits a first semi-persistent scheduling (SPS) data packet to the receiver 20.

At block 212, the receiver 20 receives the first SPS data packet and transmits a feedback message to the transmitter 10. The feedback message may be an acknowledgement (ACK) message or a negative acknowledgement (NACK) message. If the first SPS data packet is received and decoded successfully, the receiver 20 transmits the ACK message to the transmitter 10. If the first SPS data packet is corrupted when received or otherwise subject to errors, the receiver 20 cannot decode the first SPS data packet and therefore stores the received first SPS data packet and transmits the NACK message to the transmitter 10.

In the embodiment, the receiver 20 may reduce a time period of a measurement gap (MG) or a number of MGs required to reduce a rate of loss of the feedback messages. In detail, the receiver 20 may early respond a result of measurement at different frequencies to reduce the time period of the MG. For example, a default time period of the MGs is six milliseconds. In reality, the measurement operation for different frequencies is usually implemented within 1-2 milliseconds. Therefore, the receiver 20 can determine to report the result of measurement within two milliseconds so as to reduce the time period of the MGs. Moreover, if the results of measurement at different frequencies indicate that signal quality is good (meeting or more than meeting preset conditions) during a specified time period, the receiver 20 may reduce a number of measurement at the different frequencies, to further reduce the number of the MGs.

At block 213, the transmitter 10 receives the feedback message and determines whether the feedback message is ACK message or NACK message. If the feedback message is ACK message, the method 200 returns to block 210. If the feedback message is NACK message, the method 200 proceeds to block 214.

At block 214, the transmitter 10 determines that a transmission of a replacement SPS data packet is required. The replacement SPS data packet (repeat1 SPS data packet) is a repeat of the first SPS data packet.

At block 216, the transmitter 10 transmits a HARQ ID corresponding to the replacement SPS data packet to the receiver 20 via a radio resource control (RRC) message.

At block 218, the transmitter 10 transmits the replacement SPS data packet to the receiver 20 via dynamic scheduling assignment.

At block 220, the receiver 20 receives data packet via the dynamic scheduling assignment and determines whether an ID of the received data packet is the same as the HARQ ID. If the ID of the received data packet is the same as the HARQ ID, the method 200 proceeds to block 222. If not, the method 200 proceeds to block 226.

At block 222, the receiver 20 determines that the received data packet is the replacement SPS data packet, corresponding to the received first SPS data packet.

At block 224, the receiver 20 decodes a combination of the first SPS data packet and the replacement SPS data packet.

At block 226, the receiver 20 determines that the received data packet is not the replacement SPS data packet.

Figure 3:
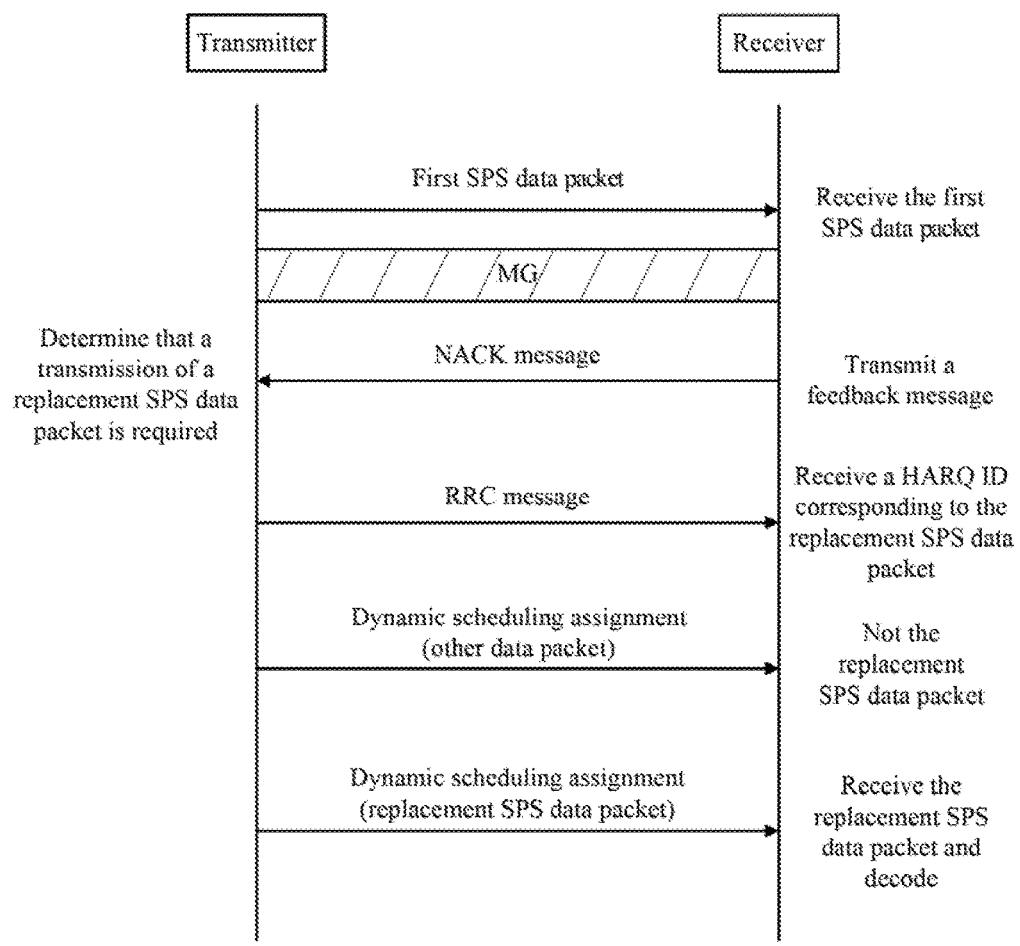
FIG. 3 illustrates a flowchart of another embodiment of the processing method for HARQ data transmissions.

Referring to FIG. 3, a flowchart is presented in accordance with another example embodiment of the method 200.

The embodiments shown and described above are only examples. Many details are often found in the art such as the other features of a communication system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a system comprising a transmitter and a receiver of a long term evolution network, the method comprising:

the transmitter transmitting a first semi-persistent scheduling (SPS) data packet to the receiver;

the receiver receiving the first SPS data packet and transmits a feedback message to the transmitter;

the transmitter receiving the feedback message and determining whether the feedback message is acknowledgement (ACK) message or negative acknowledgement (NACK) message;

the transmitter determining that a transmission of a replacement SPS data packet is required when the feedback message is NACK message;

the transmitter transmitting a hybrid automatic repeat request (HARQ) ID corresponding to the replacement SPS data packet to the receiver;

the transmitter transmitting the replacement SPS data packet to the receiver via dynamic scheduling assignment;

the receiver receiving the replacement SPS data packet via the dynamic scheduling assignment and determining whether the replacement SPS data packet comprises the HARQ ID; and the receiver decoding a combination of the first SPS data packet and the replacement SPS data packet if the replacement SPS data packet comprises the HARQ ID; and the receiver reducing a time period of a measurement gap (MG) or a number of MGs to reduce a rate of loss of the feedback messages, wherein the receiver early responds a result of measurement at different frequencies to reduce the time period of the MG and/or reducing a number of measurement at the different frequencies, when the results of measurement indicate that signal quality meeting or more than meeting preset conditions during a specified time period, to reduce the number of the MGs.

2. The method as claimed in claim 1, wherein the transmitter transmits the HARQ ID of the replacement SPS data packet to the receiver via a radio resource control (RRC) message.

3. A non-transitory storage medium, storing a set of instructions, the set of instructions being executed by a system comprising a transmitter and a receiver of a long term evolution network, to perform a method comprising:

the transmitter transmitting a first semi-persistent scheduling (SPS) data packet to the receiver;

the receiver receiving the first SPS data packet and transmits a feedback message to the transmitter;

the transmitter receiving the feedback message and determining whether the feedback message is acknowledgement (ACK) message or negative acknowledgement (NACK) message;

the transmitter determining that a transmission of a replacement SPS data packet is required when the feedback message is NACK message;

the transmitter transmitting a hybrid automatic repeat request (HARQ) ID corresponding to the replacement SPS data packet to the receiver;

the transmitter transmitting the replacement SPS data packet to the receiver via dynamic scheduling assignment;

the receiver receiving the replacement SPS data packet via the dynamic scheduling assignment and determining whether the replacement SPS data packet comprises the HARQ ID;

the receiver decoding a combination of the first SPS data packet and the replacement SPS data packet if the replacement SPS data packet comprises the HARQ ID; and the receiver reducing a time period of a measurement gap (MG) or a number of MGs to reduce a rate of loss of the feedback messages, wherein the receiver early responds a result of measurement at different frequencies to reduce the time period of the MG, and/or reducing a number of measurement at the different frequencies, when the results of measurement indicate that signal quality meeting or more than meeting preset conditions during a specified time period, to reduce the number of the MGs.

4. The non-transitory storage medium as claimed in claim 3, wherein the transmitter transmits the HARQ ID of the replacement SPS data packet to the receiver via a radio resource control (RRC) message.

5. A system of a long term evolution network, the system comprising:

a transmitter that transmits a first semi-persistent scheduling (SPS) data packet to a receiver;

the receiver that receives the first SPS data packet and transmits a feedback message to the transmitter; wherein the transmitter further receives the feedback message and determines whether the feedback message is acknowledgement (ACK) message or negative acknowledgement (NACK) message;

determines that a transmission of a replacement SPS data packet is required when the feedback message is NACK message; transmits a hybrid automatic repeat request (HARQ) ID corresponding to the replacement SPS data packet to the receiver; and transmits the replacement SPS data packet to the receiver via dynamic scheduling assignment;

the receiver further receives the replacement SPS data packet via the dynamic scheduling assignment and determines whether the replacement SPS data packet comprises the HARQ ID;

and decodes a combination of the first SPS data packet and the replacement SPS data packet if the replacement SPS data packet comprises the HARQ ID; and the receiver reducing a time period of a measurement gap (MG) or a number of MGs to reduce a rate of loss of the feedback messages, wherein the receiver early responds a result of measurement at different frequencies to reduce the time period of the MG, and/or reducing a number of measurement at the different frequencies, when the results of measurement indicate that signal quality meeting or more than meeting preset conditions during a specified time period, to reduce the number of the MGs.

6. The system as claimed in claim 5, wherein the transmitter transmits the HARQ ID of the replacement SPS data packet to the receiver via a radio resource control (RRC) message.

* * * * *